(12) United States Patent
Bakhmutsky et al.

(10) Patent No.: US 6,600,518 B1
(45) Date of Patent: Jul. 29, 2003

(54) ADAPTIVE CLIPPING PREVENTION FOR PICTURE SHARPNESS ENHANCEMENT

(75) Inventors: Michael Bakhmutsky, Spring Valley, NY (US); Johan G. Janssen, Ossining, NY (US); Egbert G. T. Jaspers, Well (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 395 days.

(21) Appl. No.: 09/706,669

(22) Filed: Nov. 6, 2000

(51) Int. Cl.[7] .......................... H04N 5/21; H04N 1/409
(52) U.S. Cl. .................. 348/625; 348/673; 348/606; 348/252; 382/266; 358/447; 358/532
(58) Field of Search ............................ 348/625, 627, 348/622, 630, 606, 607, 637, 678, 687, 688, 689, 252, 255, 257; 382/266, 263, 264, 254; 358/448, 447, 532, 463

(56) References Cited

U.S. PATENT DOCUMENTS

| | | | | |
|---|---|---|---|---|
| 5,666,443 A | * | 9/1997 | Kumashiro | 382/266 |
| 5,717,789 A | * | 2/1998 | Anderson et al. | 382/254 |
| 5,862,266 A | * | 1/1999 | Hunter | 382/266 |
| 5,867,606 A | * | 2/1999 | Tretter | 382/261 |
| 5,880,767 A | * | 3/1999 | Liu | 347/251 |
| 5,978,518 A | * | 11/1999 | Oliyide et al. | 382/260 |
| 6,005,983 A | * | 12/1999 | Anderson et al. | 382/254 |
| 6,072,538 A | * | 6/2000 | Keating | 348/625 |
| 6,094,205 A | * | 7/2000 | Jaspers | 348/625 |
| 6,148,116 A | * | 11/2000 | Park et al. | 382/266 |
| 6,252,995 B1 | * | 6/2001 | Takamori | 382/254 |
| 6,377,313 B1 | * | 4/2002 | Yang et al. | 348/630 |
| 6,476,876 B1 | * | 11/2002 | Matsunaga et al. | 348/625 |

FOREIGN PATENT DOCUMENTS

EP 0241246 A2 10/1987

OTHER PUBLICATIONS

Nat. Lab. Technical Note 137/96, "Advanced Luminance & Chrominance Sharpness Enhancement for TV–Applications", by E. G. T. Jaspers.

* cited by examiner

Primary Examiner—John Miller
Assistant Examiner—Jean W. Désir
(74) Attorney, Agent, or Firm—Laurie E. Gathman

(57) ABSTRACT

A contrast control and clipping device is configured to determine a maximum range of enhancement that may be applied to each pixel for picture sharpness enhancement. This maximum range is used to limit the enhancement that is determined by the conventional convolution kernel and gain control modules. Preferably, the maximum range is independent of the determined convolution value, thereby minimizing the bandwidth requirements among the modules used for picture sharpness enhancement. The reduced bandwidth requirement allows for an efficient partitioning of tasks between hardware and software embodiments, and eases the overall system design task. In a multi-media application, the amount of data that is transferred between the processor and sub-components is substantially reduced, and the efficient partitioning facilitates parallel processing. The maximum range of enhancement is determined based on the pixel values in the current field, using a computationally simple algorithm, thereby minimizing anomalies caused by temporal dependencies among the modules that are used for picture sharpness enhancement. Additionally, the sharpness enhancement is dynamically adjusted based on overall picture-level characteristics, including the average enhancement range, overall noise measures, and so on.

20 Claims, 3 Drawing Sheets

ADAPTIVE CLIPPING PREVENTION FOR PICTURE SHARPNESS ENHANCEMENT

BACKGROUND OF THE INVENTION

1. Field of the Invention

This invention relates to the field of video processing, and in particular to processes used to enhance a video image.

2. Description of Related Art

The "sharpness" of an image can be improved by enhancing the high-frequency components of the image; that is, by accentuating edges and other portions of an image so that changes are sharp, rather that gradual. A high-frequency enhancement, however, can cause some changes to be overly accentuated, resulting in a "speckling" of the image and other visually unappealing anomalies.

FIG. 1 illustrates a block diagram of a conventional sharpness enhancement device 100. The sharpness enhancement device 100 includes a convolution kernel 150 that functions as a high frequency filter to identify the high frequency components of the picture. Conventionally, an image on a television screen is commonly referred to as a picture. The terms image and picture are used interchangeably herein, and are meant to include all or parts of a set of data that can be processed to produce a visual rendering corresponding to the data. The convolution kernel 150 computes a convolution value for each pixel of an image, based on the pixel's visual characteristics compared to the characteristics of neighboring pixels. A convolution kernel that is commonly used to provide this value is:

$$\begin{bmatrix} 0 & -1/4 & 0 \\ -1/4 & +1 & -1/4 \\ 0 & -1/4 & 0 \end{bmatrix},$$

the center of this kernel corresponding to the pixel being processed. In this example, the value of the pixel being processed is multiplied by +1, and the values of the pixels immediately above, below, left, and right of the pixel being processed are each multiplied by $-\frac{1}{4}$, and the sum of these multiplied values is the determined convolution value for the pixel being processed. If, for example, the pixel is located in a region of uniform pixel values, the sum of the pixel value minus a quarter of each of four similar pixel values is zero. That is, no enhancements are made within a region of uniform pixel values. Conversely, if the pixel value is 100, and it is surrounded by pixel values of 40 each; the convolution value is 60 (100−10−10−10−10). That is, the larger the change of a pixel's value, relative to neighboring pixels, the larger the convolution value. This convolution value, C, is appropriately scaled by a gain factor, g, at 170, and added to the original pixel value, Yin, at 180, to form a sharpness enhanced pixel value:

$$\text{Yout} = \text{Yin} + g^*C. \quad (1)$$

The determination of an appropriate gain factor, g, in this example includes four processes 110–140; less costly systems may use fewer processes, with a corresponding lesser quality determination of the appropriate gain factor; additional processes may also be used. The contrast control 110 determines a maximum gain g1 that can be used without introducing contrast anomalies. That is, if the convolution value C is positive, and the Yin values correspond to a relatively dark area (low Yin values), a large enhancement could produce high-contrasting white values (high Yout values) which will appear as a white sparkles. Similarly, if the convolution value C is negative, and the Yin values correspond to a light area (high Yin values), a large negative enhancement could appear as black speckles (low Yout values). For example, a commonly used range of pixel values is 0 to 255, thereby allowing the pixel value to be processed as a byte, and a commonly used maximum gain factor g1 in a contrast control 110 is:

$$g1 = Yin/255 \text{ if } C > 0 \quad (2a)$$

$$g1 = (255 - Yin)/255 \text{ if } C <= 0 \quad (2b).$$

The dynamic range control 120 determines a similar maximum gain factor g2, to suppress exaggerated overshoots, and the adaptive coring 130 determines a maximum gain factor g3, to enhance noise reduction. For example, in a high noise environment, the maximum gain g3 is kept low if the convolution value C is small, to prevent noise induced changes from being accentuated, while allowing large changes, corresponding to edges in the image, to receive a larger gain.

The output Yout from the adder 180 will be clipped to lie within the minimum and maximum range of pixel values. The clipping prevention element 140 determines a maximum gain factor g4 to minimize the aliasing that is produced by excessive output clipping. In an example embodiment, the image is divided into blocks, and the number of clippings that occur within each block is used to determine a maximum gain factor associated with each block that will have the effect of reducing the number of clippings within the block. This block-level information is transferred to the pixels by computing a gain factor g4 for each pixel, based on a bilinear interpolation of the block gain factors. To avoid rapid changes in the time domain, the block gain factors are low pass filtered, using for example a weighted sum of prior gains.

Each of these maximum gain factors g1, g2, g3, g4 are determined substantially heuristically, each based on a particular set of criteria, and often produce substantially different results. For example, a large Yin value and positive convolution value C will produce a relatively high gain g1 (equation 2a), but, a large Yin value will often result in a relatively small gain g4, to minimize clipping. These potentially conflicting gains are reconciled by a conservative selection process: the gain selector 160 selects the minimum of the gains g1, g2, g3, and g4 as the appropriate gain to be used. That is, the minimum gain among the maximum determined gains g1, g2, g3, g4 is selected in order to provide a maximum sharpness enhancement while attempting to avoid the possible effects of over-enhancing the pixel values.

The above described prior art processes are computationally complex, and typically require the use of data derived from a prior image to determine the gains to be used on a current image. The results of these processes can produce anomalous results if fast motion is present between one image and the next. Also, the prior art processes require communication between the processes that can lead to a high bandwidth requirement, particularly when some processes are implemented in software and other processes are implemented in hardware. In particular, the convolution kernel 150 preferably resides in hardware, because of the uniform and repetitive nature of the convolution algorithm, whereas the clipping prevention module 140 preferably resides in software, because of the heuristic rules-based algorithm typically employed. Often, the preferred partitioning of processes cannot be achieved, due to bandwidth limitations.

In a multimedia processing system, for example, a preferred partitioning based on the appropriate embodiment to effect each particular task, or to facilitate parallel processing, often cannot be realized, due to the processor-bus bandwidth requirements that such a partitioning would produce. Often, tasks which should be performed in software are embodied in hardware, and vice versa, so as to minimize the amount of data that is transferred via the processor-bus.

BRIEF SUMMARY OF THE INVENTION

It is an object of this invention to provide a less complex method of clipping prevention during picture sharpness enhancement. It is a further object of this invention to reduce the inter-process dependencies during picture sharpness enhancement. It is a further object of this invention to reduce the conflicting results of contrast control and clipping control during picture sharpness enhancement. It is a further object of this invention to minimize the temporal data dependencies during picture sharpness enhancement. It is a further object of this invention to dynamically adjust the picture sharpness enhancement based on the overall enhancement potential of each picture and the overall noise associated with the channel.

These objects and others are achieved by providing a contrast control and clipping device that is configured to determine a margin of enhancement that may be applied to each pixel. This margin is used to limit the enhancement that is determined by the conventional convolution kernel and gain control modules. Preferably, the margin is independent of the determined convolution value, thereby minimizing the bandwidth requirements among the modules used for picture sharpness enhancement. The reduced bandwidth requirement allows for an efficient partitioning of tasks between hardware and software embodiments, and eases the overall system design task. In a multi-media application, the amount of data that is transferred between the processor and sub-components is substantially reduced, and the efficient partitioning facilitates parallel processing. The margin is determined based on the pixel values in the current picture, using a computationally simple algorithm, thereby minimizing anomalies caused by temporal dependencies among the modules used for picture sharpness enhancement. Additionally, the sharpness enhancement is dynamically adjusted based on overall picture-level characteristics, including the average enhancement range, overall noise measures, and so on.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

Figure 1:
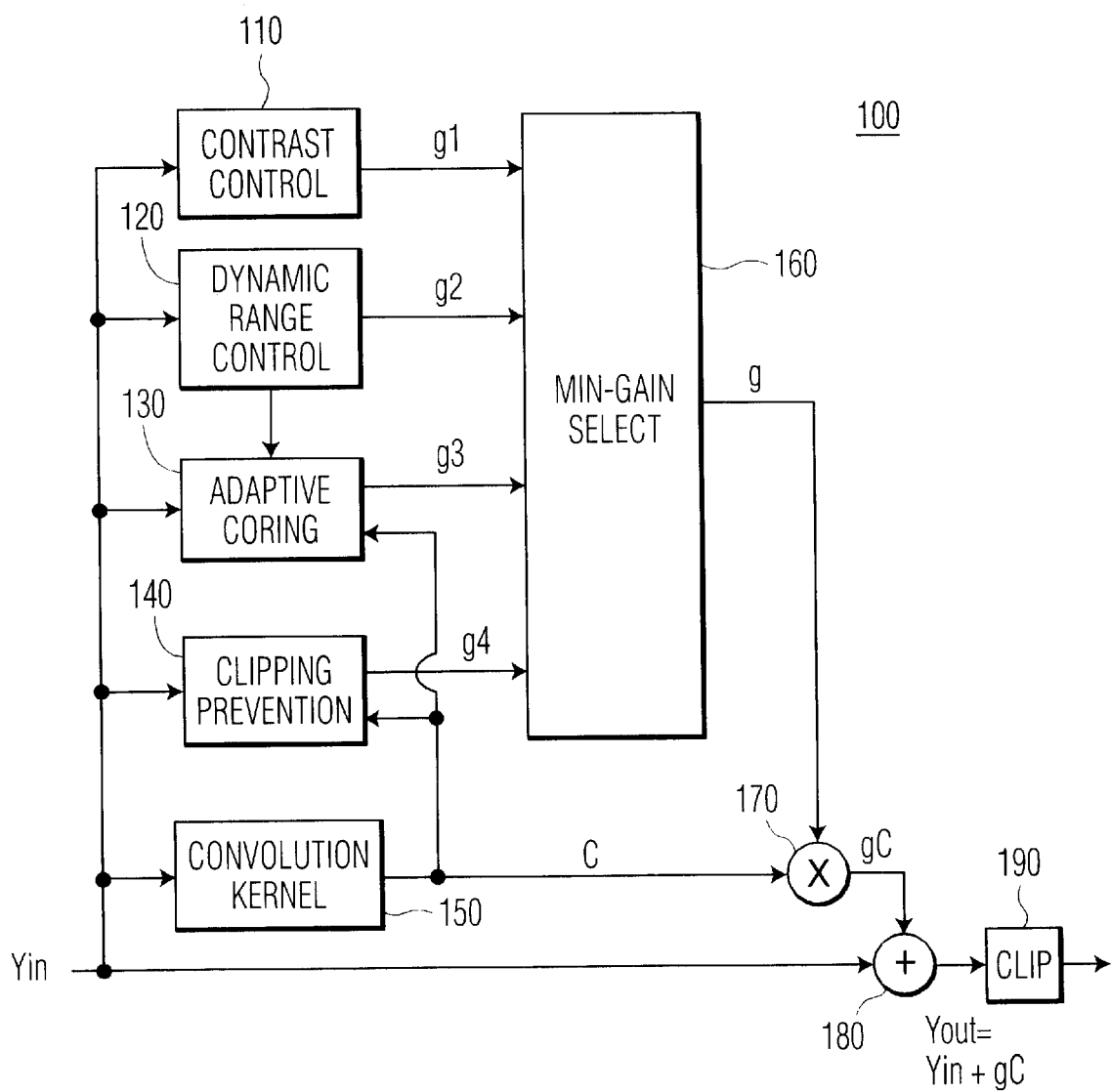
FIG. 1 illustrates an example block diagram of a prior art picture sharpness enhancement system.
Figure 2:
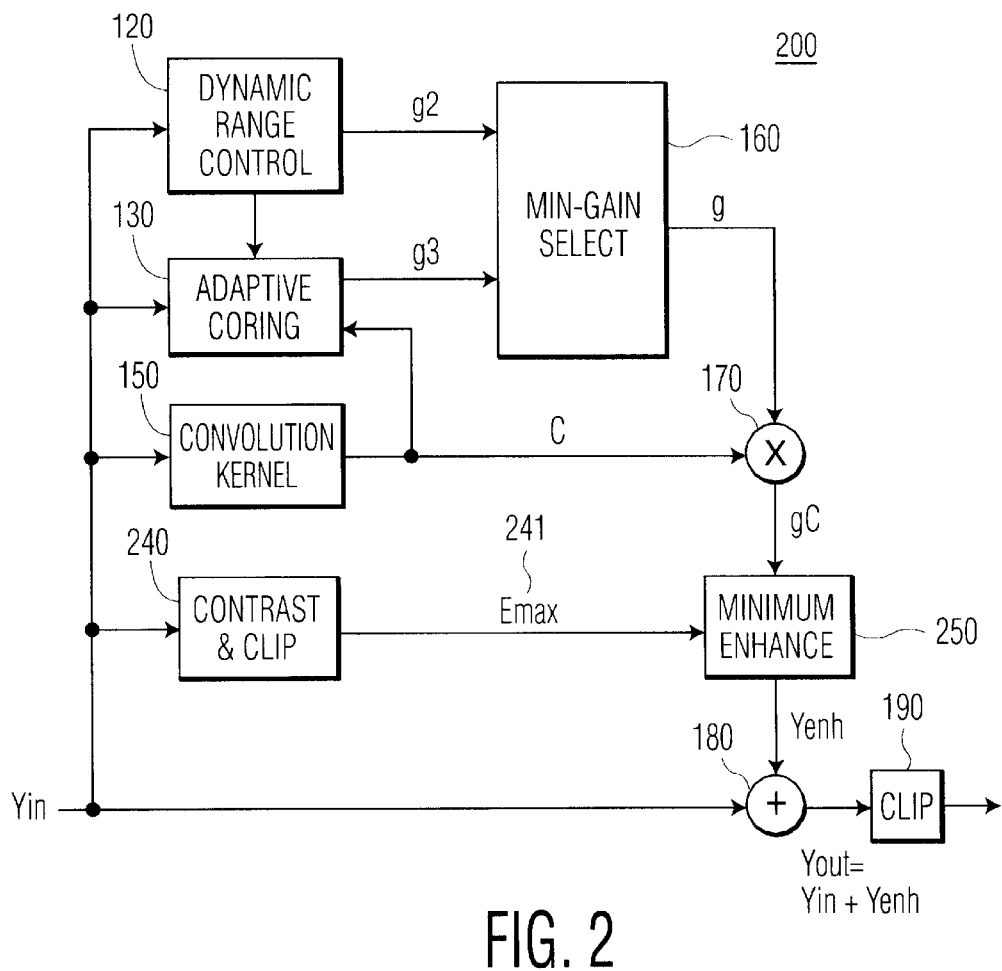
FIG. 2 illustrates an example block diagram of a picture sharpness enhancement system in accordance with one aspect of this invention.

FIG. 2 illustrates an example block diagram of a picture sharpness enhancement system 200 in accordance with this invention. As noted above, the contrast control 110 and clipping prevention 140 modules of the prior art system 100 illustrated in FIG. 1 often produce conflicting results regarding the maximum amount of gain (g1 and g4, respectively) that may be applied to determine each pixel's convolution-determined enhancement (g*C). In a preferred embodiment of this invention, the conventionally independent functions of contrast control and clipping prevention are integrated into a single contrast and clipping control module 240 in the sharpness enhancement system 200 of FIG. 2.

To prevent clipping, the enhancement that is added to each pixel's value should not produce an output pixel value that is beyond the range of allowable pixel values. An example allowable range of pixel values of 0 to 255 is used herein, for ease of reference and understanding, although any other range may be used:

$$0 <= Yin + Yenh <= 255 \quad (3)$$

If the determined convolution C value for the pixel is positive, the (positive) enhancement Yenh (=g*C) must not bring the sum over 255; if the convolution value C is negative, the (negative) enhancement Yenh must not bring the sum below 0. That is, equation (3) can be reformulated as:

$$\text{If } C>=0 \text{ then } Yenh<=255-Yin \quad (4a)$$

$$\text{else } |Yenh|>=Yin. \quad (4b)$$

The maximum enhancement Emax that is allowable without introducing clipping can therefore be expressed as:

$$\text{If } C>=0 \text{ then } Emax=255-Yin \quad (5a)$$

$$\text{else } |Emax|=Yin. \quad (5b)$$

As noted above, the required communication between the conventional convolution kernel 150 and the clipping prevention module 140 of FIG. 1 introduces bandwidth requirements among the modules 110–190 that limit the performance of the conventional clipping prevention module 140, or that limit the design choices for partitioning a video processing system. In a preferred embodiment of this invention, the contrast and clipping control module 240 operates substantially independent of the convolution kernel 150, as illustrated in FIG. 2. To provide a maximum enhancement Emax that is independent of the convolution C, equations 5a and 5b are replaced by:

$$|Emax|=Min(255-Yin, Yin). \quad (6)$$

That is, by limiting the maximum enhancement to the minimum of the maximum positive enhancement and the maximum negative enhancement, the resultant pixel output value can be assured to lie within the allowable range of pixel values.

If equation 6 is applied directly to determine the maximum allowable enhancement for each pixel value, however, the allowable enhancements to adjacent pixels may be substantially different, and adverse visual effects will be produced. In a preferred embodiment, the maximum enhancement for each pixel is determined based on a smoothing of enhancement range over an area, as illustrated in FIG. 3.

Figure 3:
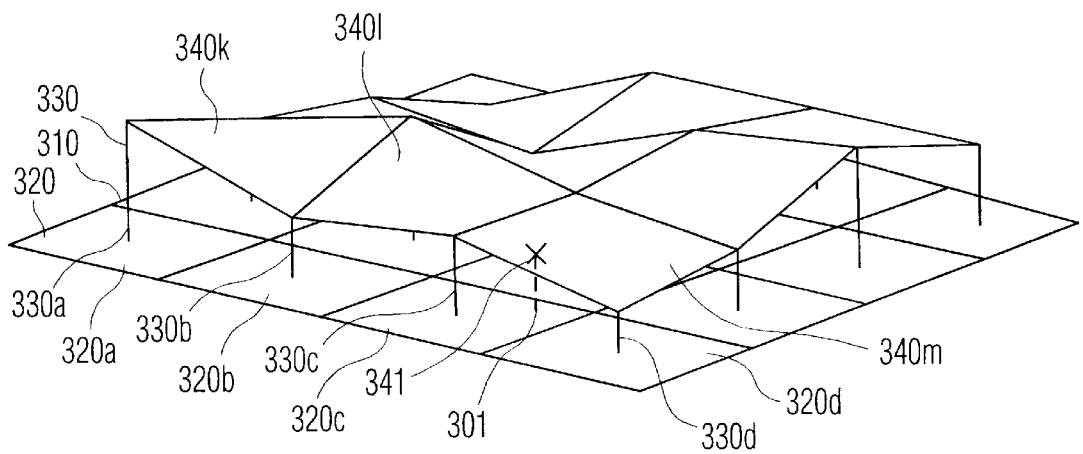
FIG. 3 illustrates an example enhancement margin map that facilitates a determination of each pixel's maximum enhancement range in accordance with this invention.

In FIG. 3, a picture 310 is divided into blocks 320 (320a, 320b, 320c, 320d, etc.). In a preferred embodiment, the blocks 320 contain 16×16 pixels. Associated with each block 320 is a maximum block enhancement 330 (330a, 330b, 330c, 330d, etc.). Because the maximum enhancement 330 is intended to assure that no pixel within the block is enhanced beyond the allowable pixel range, the block enhancement 330 is defined as the minimum of the maximum allowable enhancement of each pixel within the block, as determined by equation (6) for each pixel (i):

$$B_{max} = Min_i[Min(255-Yin_i, Yin_i)]. \quad (7)$$

Note that this minimization among both (Yin) and (255−Yin) for each individual pixel within the block effects a contrast control function, discussed above, by limiting the enhancement to the smaller extent from either of the extremes of black (0) or white (255).

For ease of reference and terminology, the term enhancement margin is used hereinafter to define the maximum allowable enhancement magnitude that is associated with each pixel. Limiting the enhancement margin of each pixel within each block to the Bmax term given in equation (7) will eliminate divergent enhancement margins among adjacent pixels, but will produce discontinuities at each block boundary and corresponding adverse visual effects. In a preferred embodiment of this invention, the enhancement margin for each pixel is determined by a bilinear interpolation of the surrounding block enhancement (Bmax) values, as illustrated by the surfaces (340k, 340l, 340m, etc.) of the example contour map 340, and corresponding to the following:

$$Emax_i = \sum_{x}^{x+1} \sum_{y}^{y+1} W(i, x, y) B_{max}(x, y) \quad (8)$$

where W(i,x,y) is the weight associated with each of the block enhancement Bmax(x,y) values, dependent on the distance of the pixel i from the center of each block(x,y). FIG. 3 illustrates an enhancement margin (Emax$_i$) 341 for a pixel 301 that is determined by a bilinear interpolation of the block enhancement values ($B_{max}$(x,y)) 330 in the immediate area of the pixel 301, the enhancement margin 341 being a point X on the contour surface 340m corresponding to the location of the pixel 301 in the picture 310. This bilinear interpolation also provides the advantageous low pass filtering of the enhancement margin, thereby minimizing the visual anomalies caused by substantially different degrees of enhancements within local regions of the picture.

As illustrated in FIG. 2, this enhancement margin 240 for each pixel, as defined by equation (8) above, is provided to an enhancement limiter 250. The convolution kernel 150, the gain limiting modules 120 and 130, the minimum gain selector 160, and multiplier 170, operate as described with regard to FIG. 1, and provide a convolution-based enhancement g*C to the enhancement limiter 250. In accordance with this invention, the magnitude of the enhancement Yenh that is added to the input pixel value Yin, or subtracted from the input pixel value Yin, is:

$$|Yenh_i| = Min(Emax_i, |g_i C_i|). \quad (9)$$

The sign of the enhancement Yenh is the sign of g*C term, which corresponds to the sign of the convolution value C.

Thus, as shown, the determination of a pixel enhancement value can be effected using relatively simple computations. Note that the determination of the enhancement margin is based only on the pixel value and the allowable range of the pixel value. Also note that if the allowable range of an n-bit pixel value spans a range of 0 to $2^n-1$, the calculation of the (MaxRange−Yin) term can be effected by merely performing an inversion (ones-complement) of the n bits of the Yin term. Because of the simplicity provided, the enhancement margins of equation (8) in accordance with this invention can be computed based on the pixel values of the current picture, thereby eliminating temporal data dependencies in clipping prevention.

The above described process facilitates a substantial reduction in the bandwidth requirements of a typical system. The removal of the convolution value C of each pixel from the determination of the enhancement margin for each pixel substantially reduces the bandwidth requirements among the modules of FIG. 2, thereby facilitating the partitioning of modules among hardware and software embodiments, as desired. Also, in a preferred embodiment of the contrast and clip module 240, the determination of the ($B_{max}$(x,y)) terms of equation (8), above, is performed in software, and the bilinear interpolation of these values to determine the enhancement value Emax$_i$ 241 for each pixel is performed in hardware. This preferred partitioning can be achieved because each block typically corresponds to hundreds of pixels (e.g. 16×16 pixel blocks), and the transfer of one $B_{max}$(x,y) term per hundreds of pixel terms, from the processor that is executing the software that determines $B_{max}$(x,y) to the hardware that provides the interpolation per pixel, consumes a relatively small amount of the available processor-bus bandwidth.

Figure 4:
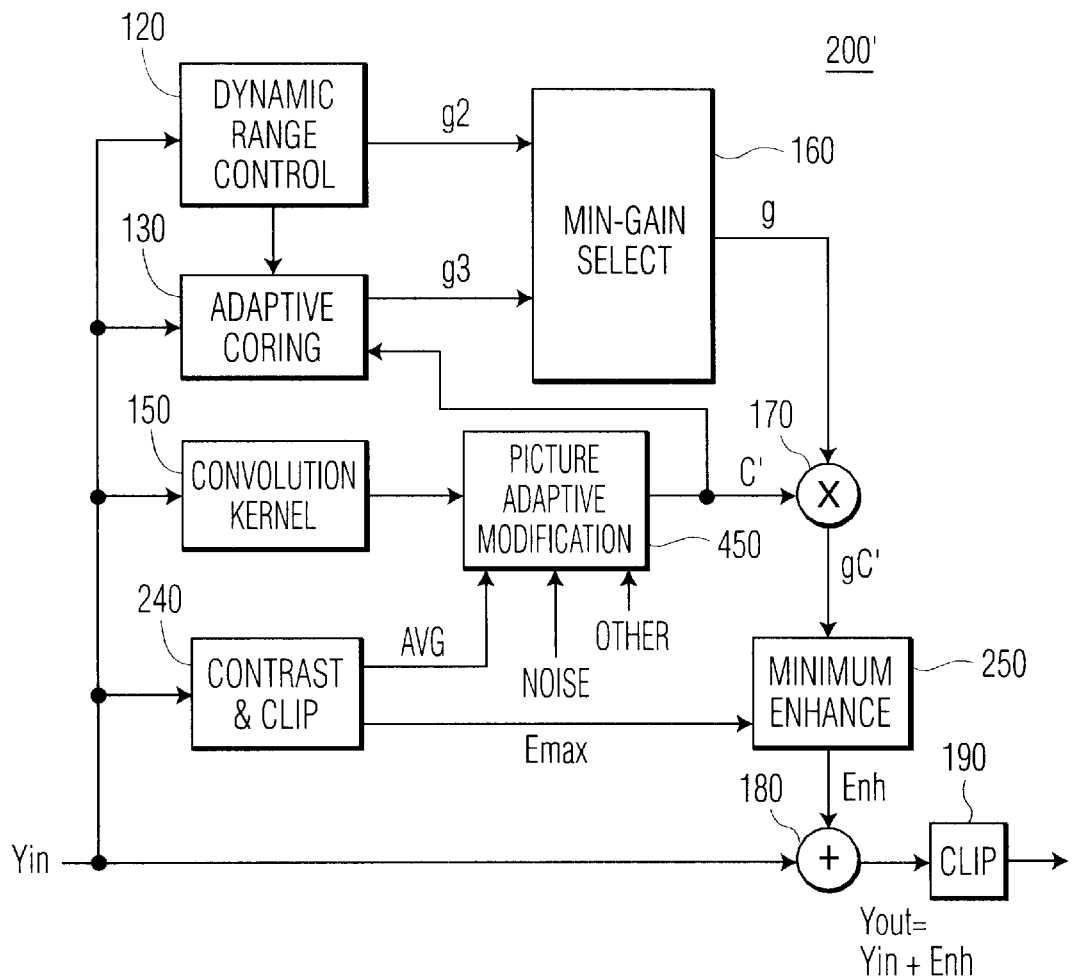
FIG. 4 illustrates an example block diagram of a picture sharpness enhancement system in accordance with another aspect of this invention.

In accordance with another aspect of this invention, the margin map of FIG. 3 is used to dynamically adjust the convolution value C based on the characteristics associated with the entire picture, as illustrated in FIG. 4.

FIG. 4 illustrates an alternative sharpness enhancement system 200' having a picture-adaptive modification block 450 that adjusts the convolution value C based on the average of the block enhancement factors, and, optionally, based on other picture-level characteristics, such as a picture noise measurement. A high average block enhancement margin implies a high potential for sharpness enhancement, whereas a low average block enhancement margin implies a high likelihood of clipping if sharpness enhancement is applied. In a preferred embodiment of this invention, the picture-adaptive modification block 450 attenuates the convolution value C if the average block enhancement margin is low. In like manner, sharpness enhancement in the presence of noise generally produces noise-induced sparkles and other anomalies. In a preferred embodiment of this invention, the picture-adaptive modification block 450 attenuates the convolution value C if a noise measurement that is associated with the picture or communications channel is high. Other heuristics, such as actually clipping rates, may also be used to dynamically modify the convolution value C to produce a visually pleasing result. In like manner, an identification of the source of the picture may also be used to dynamically modify the convolution value C. For example, a picture from a DVD player needs little or no enhancement, whereas a picture from a television broadcaster may need a substantial amount of enhancement, depending upon the transmission format and media. A transmitted HDTV picture that is processed by an HDTV-compatible receiver should require less enhancement than a non-HDTV picture, and so on.

Figure 5:
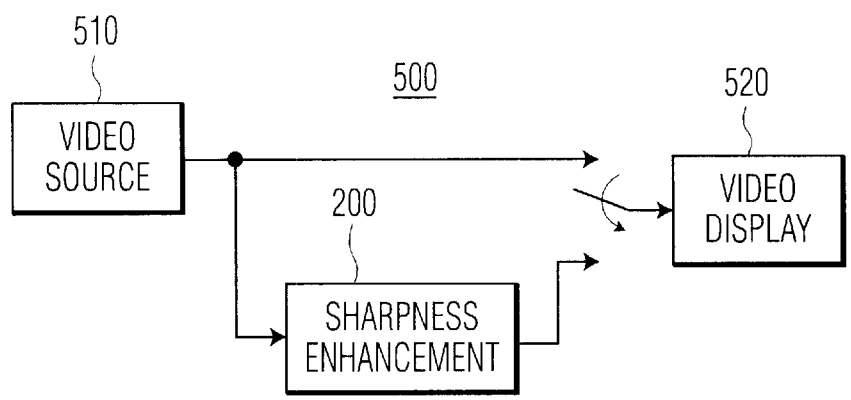
FIG. 5 illustrates an example block diagram of a video display system having a picture sharpness enhancement device in accordance with this invention.

FIG. 5 illustrates an example block diagram of a video display system 500 having a picture sharpness enhancement device 200 (or 200') in accordance with this invention. A source of video or other image information 510 provides an array of pixel values corresponding to a characteristic, such as the luminance, of each pixel within a picture. The sharpness enhancement module 200 is configured as discussed above to accentuate the high-frequency components of the array of pixel values, thereby accentuating the edge characteristics of the image, producing an image that appears 'sharper' than the original. Generally, the application of the sharpness enhancement is provided as an option, as indicated by the switch 520. When selected, the sharpened picture is provided to a video display device 530, in lieu of the original picture. Note that although this invention is particularly well suited to the sharpening of sequential images, such as a television broadcast, video conferencing, and video playback, the principles of this invention are equally applicable to the sharpening of still images as well.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

I claim:

1. A sharpness enhancement system comprising:
   a filter that is configured to determine a high-frequency factor that is associated with a pixel of an array of pixels,
   one or more gain control modules that are configured to determine a gain factor that is applied to the high-frequency factor to produce a high-frequency enhancement term,
   a clipping control module that is configured to determine a pixel enhancement margin associated with the pixel based only upon a value associated with the pixel and an allowable range of the value, and
   an enhancement limiter that is configured to receive the high-frequency enhancement term and the pixel enhancement margin and produces therefrom a pixel enhancement value that facilitates a determination of a sharpness enhanced pixel output value.

2. The sharpness enhancement system of claim 1, wherein the filter includes a convolution kernel that is configured to provide the high-frequency factor based on the value associated with the pixel and values associated with pixels that are adjacent to the pixel.

3. The sharpness enhancement system of claim 1, wherein the one or more gain control modules include at least one of:
   a dynamic range control module, and
   an adaptive coring module.

4. The sharpness enhancement system of claim 1, wherein the clipping control module is also configured to effect a contrast control.

5. The sharpness enhancement system of claim 4, wherein the clipping control module is configured to determine the pixel enhancement margin based on a minimum of:
   the value of the pixel minus a minimum allowable value of the pixel, and
   a maximum allowable value of the pixel minus the value of the pixel.

6. The sharpness enhancement system of claim 1, wherein the clipping control module is configured to determine the pixel enhancement margin based on enhancement margins associated with a plurality of pixels within each of a plurality of blocks that form the array of pixels.

7. The sharpness enhancement system of claim 1, wherein the clipping control module is configured to determine the pixel enhancement margin based on a bilinear interpolation of block enhancement margins associated with each of a plurality of blocks in proximity to the pixel, and
   the block enhancement margins are based on values of pixels within each block of the plurality of blocks.

8. The sharpness enhancement system of claim 7, wherein the block enhancement margins are based on a minimum of:
   the value of each pixel within each block minus a minimum allowable pixel value, and
   a maximum allowable pixel value minus the value of each pixel within each block.

9. A method of sharpness enhancement comprising:
   determining a high-frequency factor that is associated with a pixel of an array of pixels,
   determining a gain factor that is applied to the high-frequency factor to produce a high-frequency enhancement term,
   determining a pixel enhancement margin associated with the pixel based only upon a value associated with the pixel and an allowable range of the value,
   limiting the high-frequency enhancement term based on the pixel enhancement margin.

10. The method of claim 9, wherein determining the high-frequency factor is based on the value associated with the pixel and values associated with pixels that are adjacent to the pixel.

11. The method of claim 10, wherein determining the gain factor is based on at least one of: a dynamic range control, and an adaptive coring control.

12. The method of claim 9, wherein determining the pixel enhancement margin also effects a contrast control.

13. The method of claim 12, wherein determining the pixel enhancement margin includes determining a minimum of:
   the value of the pixel minus a minimum allowable value of the pixel, and
   a maximum allowable value of the pixel minus the value of the pixel.

14. The method of claim 9, further including partitioning the array of pixels into a plurality of blocks, each block of the plurality of blocks comprising a plurality of pixels, and
   wherein
   determining the pixel enhancement margin is based on enhancement margins associated with the plurality of pixels within each of the plurality of blocks.

15. The method of claim 9, wherein determining the pixel enhancement margin is based on a bilinear interpolation of block enhancement margins associated with each of a plurality of blocks in proximity to the pixel, and
   the block enhancement margins are based on values of pixels within each block of the plurality of blocks.

16. The method of claim 15, wherein the block enhancement margins are based on a minimum of:
   the value of each pixel within each block minus a minimum allowable pixel value, and a maximum allowable pixel value minus the value of each pixel within each block.

17. A video display system comprising:
a source of a picture comprising a plurality of pixels, each pixel having an associated pixel value,
a sharpness enhancement device, operably coupled to the source of the picture, that is configured to enhance the high-frequency components of the picture by modifying one or more of the pixel values, thereby forming a sharpness enhanced picture, and
a display device, operably coupled to the sharpness enhancement device, that is configured to display the sharpness enhanced picture;
wherein
the sharpness enhancement device comprises:
a filter that is configured to determine a high-frequency factor that is associated with each pixel of the picture,
one or more gain control modules that are configured to determine a gain factor that is applied to the high-frequency factor to produce a high-frequency enhancement term associated with each pixel,
a clipping control module that is configured to determine a pixel enhancement margin associated with each pixel based only upon the associated pixel value and an allowable range of the pixel value, and
an enhancement limiter that is configured to receive the high-frequency enhancement term and the pixel enhancement margin and produces therefrom a pixel enhancement value that facilitates a determination of a modified pixel value within the sharpness enhanced picture.

18. The video display system of claim 17, wherein
the filter includes a convolution kernel that is configured to provide the high-frequency factor based on each pixel value and corresponding adjacent pixel values.

19. The video display system of claim 17, wherein
the clipping control module is configured to determine the pixel enhancement margin based on a minimum of:
the each pixel value minus a minimum allowable pixel value, and
a maximum allowable pixel value minus each pixel value.

20. The video display system of claim 17, wherein
the clipping control module is configured to determine the pixel enhancement margin based on block enhancement margins associated with each of a plurality of blocks that form the picture.

\* \* \* \* \*